(12) United States Patent
Song

(10) Patent No.: US 7,073,618 B1
(45) Date of Patent: Jul. 11, 2006

(54) FLUSH MOUNTED TAILLIGHT

(75) Inventor: Michael M. Song, Maple Grove, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/610,775

(22) Filed: Jul. 1, 2003

(51) Int. Cl.
*B62D 61/02* (2006.01)

(52) U.S. Cl. ............... 180/219; 280/288.4; 362/475

(58) Field of Classification Search ............. 180/190, 180/219; 362/473, 475, 476; 40/556; 280/288.4
See application file for complete search history.

(56) References Cited

U.S. PATENT DOCUMENTS

| | | | |
|---|---|---|---|
| 2,595,331 A | 5/1952 | Calihan et al. ............. 177/329 |
| 3,828,178 A * | 8/1974 | Bickel ......................... 362/546 |
| 3,941,994 A | 3/1976 | Petty et al. .............. 240/8.1 R |
| 4,929,866 A | 5/1990 | Murata et al. ............. 313/500 |
| 5,093,768 A | 3/1992 | Ohe ............................ 362/241 |
| 5,713,653 A * | 2/1998 | White et al. ................ 362/473 |
| 5,964,312 A | 10/1999 | Maldonado ................. 180/227 |
| 6,280,480 B1 * | 8/2001 | Tuttle et al. ................ 362/518 |
| 6,331,063 B1 | 12/2001 | Kamada et al. ............ 362/237 |
| 6,346,771 B1 | 2/2002 | Salam ......................... 313/499 |
| 6,398,988 B1 | 6/2002 | Jenkins et al. .............. 264/2.2 |
| D463,341 S * | 9/2002 | Crookes et al. ............ D12/186 |
| 6,840,661 B1 * | 1/2005 | Desjardins .................. 362/545 |
| 2001/0027888 A1 | 10/2001 | Scherbarth ................. 180/219 |
| 2002/0024822 A1 | 2/2002 | Pond et al. ................. 362/555 |
| 2002/0089849 A1 | 7/2002 | Lamke et al. .............. 362/241 |
| 2003/0063472 A1 * | 4/2003 | Ban et al. ................... 362/473 |
| 2004/0070986 A1 * | 4/2004 | Takahashi ................... 362/487 |
| 2004/0079009 A1 * | 4/2004 | Arrua .......................... 40/204 |
| 2004/0130901 A1 * | 7/2004 | Kashiwagi .................. 362/473 |
| 2005/0122729 A1 * | 6/2005 | Katagiri ...................... 362/475 |
| 2006/0023462 A1 * | 2/2006 | Uemoto et al. ............. 362/475 |

OTHER PUBLICATIONS

Steve Anderson, Honda Rune (Cycle World) ( Sep. 2003) pp. 36-40.
Bruce Reeve, Rod Almighty, Impression Honda NRX1800 Rune (Cycle Canada) ( Sep./Oct. 2003) pp. 22-26.
Lastest News Honda Press Release Honda Unveils 2003 Motorcycle Models in Chicago—Sep. 13, 2002, Valkyrie Rune [online] [Retrieved on Mar. 23, 2004] Retrrieved from http://www.forider.com/Rune/latest_news_Honda_press_release.htm, p. 1.
Honda Motor Co., Ltd. Service Publication Office, *Honda 2004 Service Manual NRX 1800 Valkyrie Rune* (May 2003) pp. 1-1, 1-11, 1-42, 3-1, 3-6, 20-1, 20-2, 20-3, 20-9 and 20-10.

(Continued)

*Primary Examiner*—Tony Winner
(74) *Attorney, Agent, or Firm*—Baker & Daniels LLP

(57) ABSTRACT

A light assembly for mounting to a motorcycle fender that has an aperture sized to receive the light assembly, the light assembly in embodiments of the invention may include one or more of the following features: (a) a reflector, (b) a source of light, and (c) a lens having a shape conforming to an outer surface of the fender wherein the lens is flush with the outer surface of the fender.

34 Claims, 6 Drawing Sheets

OTHER PUBLICATIONS

American Honda Motor Co., Inc. *Honda Parts Catalog NRX1800DA/DB/EA/EB '04* (Mar. 2003) pp. 2-3, 2-61; 2-62, 2-65 and 2-66.

Art Friedman, Rolling Whiplash Aboard the Wildest Production Cruiser Honda—or Anyone Else-Has Ever Built, Honda Valkyrie Rune Preview 2004 (Motorcyclist) ( Sep. 2003) pp. 24-30.

* cited by examiner

FLUSH MOUNTED TAILLIGHT

CROSS REFERENCE TO RELATED APPLICATION

This application claims priority to and incorporates by reference the entire contents of U.S. Design Application Ser. No. 29/167,053 titled "Motorcycle Rear Fender" dated Nov. 11, 2003.

TECHNICAL FIELD

The present invention relates generally to the field of motorcycles and, more specifically, to the field of fenders.

BACKGROUND

Motorcycles typically include fenders positioned over the wheels to prevent debris (e.g., dirt, water, etc.) from being thrown into the air as the motorcycle travels over a surface. For example, front and rear fenders can be positioned around the front and rear wheels, respectively.

The front fender can be coupled to the front fork of the motorcycle so the front fender turns with the fork and wheel. The front fender can be secured to the fork so the front fender either moves upward when the front wheel encounters a bump or, alternatively, stays stationary relative to the upward moving wheel.

The rear fender can be coupled to the tail section of the frame in a position over the rear wheel. This is commonly done in such a way that the rear fender does not move with the rear wheel when the rear wheel encounters a bump. In this design, the rear fender is typically bolted to the tail section of the motorcycle using bolts passing through the tail section and through the rear fender.

Rear fenders are also commonly used to support a taillight assembly, which can include a brake light and/or directional lights. These lights are provided with power from a main control box, which is typically located in front of the rear fender, via a taillight wire harness. This harness can be routed around the underside of the rear fender using wiring clips to hold the harness in place.

With reference to FIGS. 1 & 2, prior rear fender taillight assemblies are shown. These traditional taillights 10 have separate components mounted on surface 12 of rear fender 14. The taillights 10 protrude beyond surface 12 of fender 14. While these prior taillight assemblies have proven useful in alerting those behind the vehicle the vehicle is stopping or braking, there are problems associated with these protruding taillight assemblies. Often these protruding taillight assemblies are broken when encountering obstacles during the life of the motorcycle. Since these taillight assemblies protrude from the fender, 14 they are susceptible to being contacted and broken by obstacles. For example, often a motorcycle must be backed out of a storage location. If the user is inattentive or there is an unseen obstacle behind the motorcycle, there is a risk that the taillight 10 would encounter the obstacle first and be broken by the obstacle.

In addition, because these prior taillight assemblies have several individual components, such as a lens, a halogen bulb, a housing for the bulb, a mounting bracket for the housing, etc., the materials cost as well as the labor cost in assembling the components increase. Further, many of these components are made of chrome, which can be very expensive. Additionally, halogen bulbs are vibration sensitive. This causes frequent failures, which necessitates easy access for service from the outside of the fender.

It is desirable to provide a taillight assembly that overcomes some of the disadvantages with the prior art assemblies. Further, it is desirable to provide a taillight assembly with minimal components to reduce the amount of materials used and the cost of assembling these components.

SUMMARY

A motorcycle light assembly apparatus in embodiments of the invention may include one or more of the following features: (a) a light source, (b) a lens having a shape conforming to an outer surface of a rear fender and covering said light source, said lens being generally flush with the outer surface, (c) a reflector section housing said light source and secured to said lens; and (d) a fastener to attach said reflector section within a cavity in said fender.

A motorcycle in embodiments of the invention may include one or more of the following features: (a) a frame, (b) a front wheel coupled to the frame, (c) a rear wheel coupled to the frame, (d) a fender having aperture extending inwardly from an outer surface of the fender, (e) a light source mount disposed in the aperture, (f) a lens having a shape conforming to the outer surface and covering the mount; the lens being generally flush with the outer surface of the fender, and (g) a ridge on the outer surface of the fender, wherein the ridge defines a wire path, and wherein the motorcycle further includes wires positioned in the wire path providing power to the light source.

A motorcycle having a rear wheel secured by axle nuts, an integrated motorcycle fender and light assembly in embodiments of the invention may include one or more of the following features: (a) a fender having a cavity, (b) a light emitter located within the cavity, (c) a lens, shaped in a generally continuation of existing curvilinear contours of the fender, covering the cavity, the lens when mounted covers the light emitter, wherein the lens covering the cavity is integral and continuous with the curvilinear external contour of the fender, making the fender and a light assembly consisting of the light emitter and lens integrated, and (d) electrical wiring for the light emitter routed within a ridge traversing generally the entire length of the fender.

A motorcycle having a rear wheel, an integrated fender and light assembly in embodiments of the invention may include one or more of the following features: (a) a fender having a curvilinear external contour and a cavity disruptive of the curvilinear external contour, (b) a light emitter located within the cavity, (c) a lens shaped generally in continuation of existing curvilinear contours of the fender, covering the cavity, the lens when mounted covers the light emitter, wherein the lens covering the cavity is integral and continuous with the curvilinear external contour of the fender, and (d) electrical wiring for the light emitter routed within a ridge traversing generally the entire length of the fender.

A light assembly for mounting to a motorcycle fender that has an aperture sized to receive the light assembly, the light assembly in embodiments of the invention may include one or more of the following features: (a) a reflector, (b) a source of light, and (c) a lens having a shape conforming to an outer surface of the fender wherein the lens is flush with the outer surface of the fender.

DETAILED DESCRIPTION OF THE PREFERRED EMBODIMENTS OF THE PRESENT INVENTION

Figure 1:
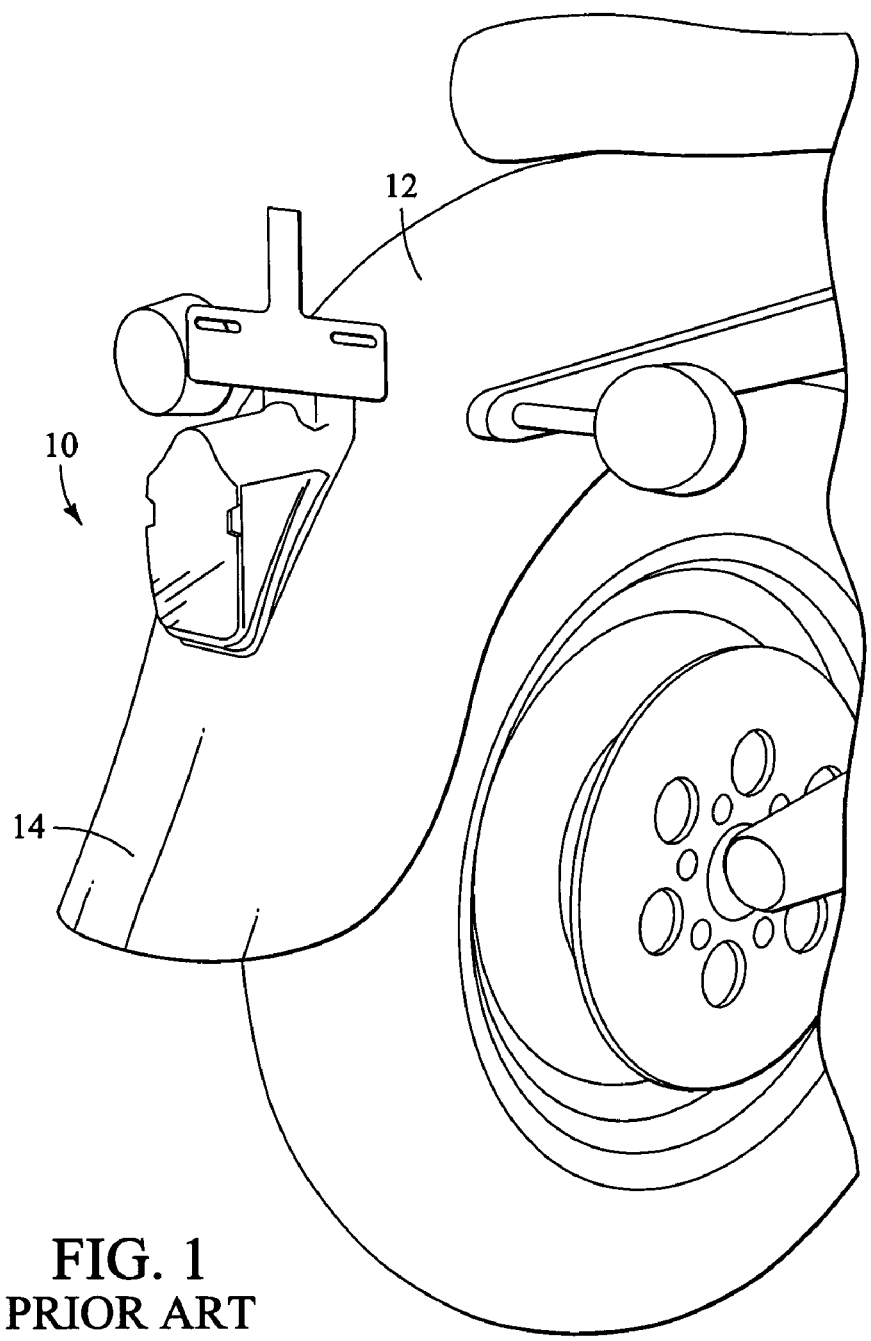
FIG. 1 is a pictorial representation of a prior art motorcycle taillight assembly.
Figure 2:
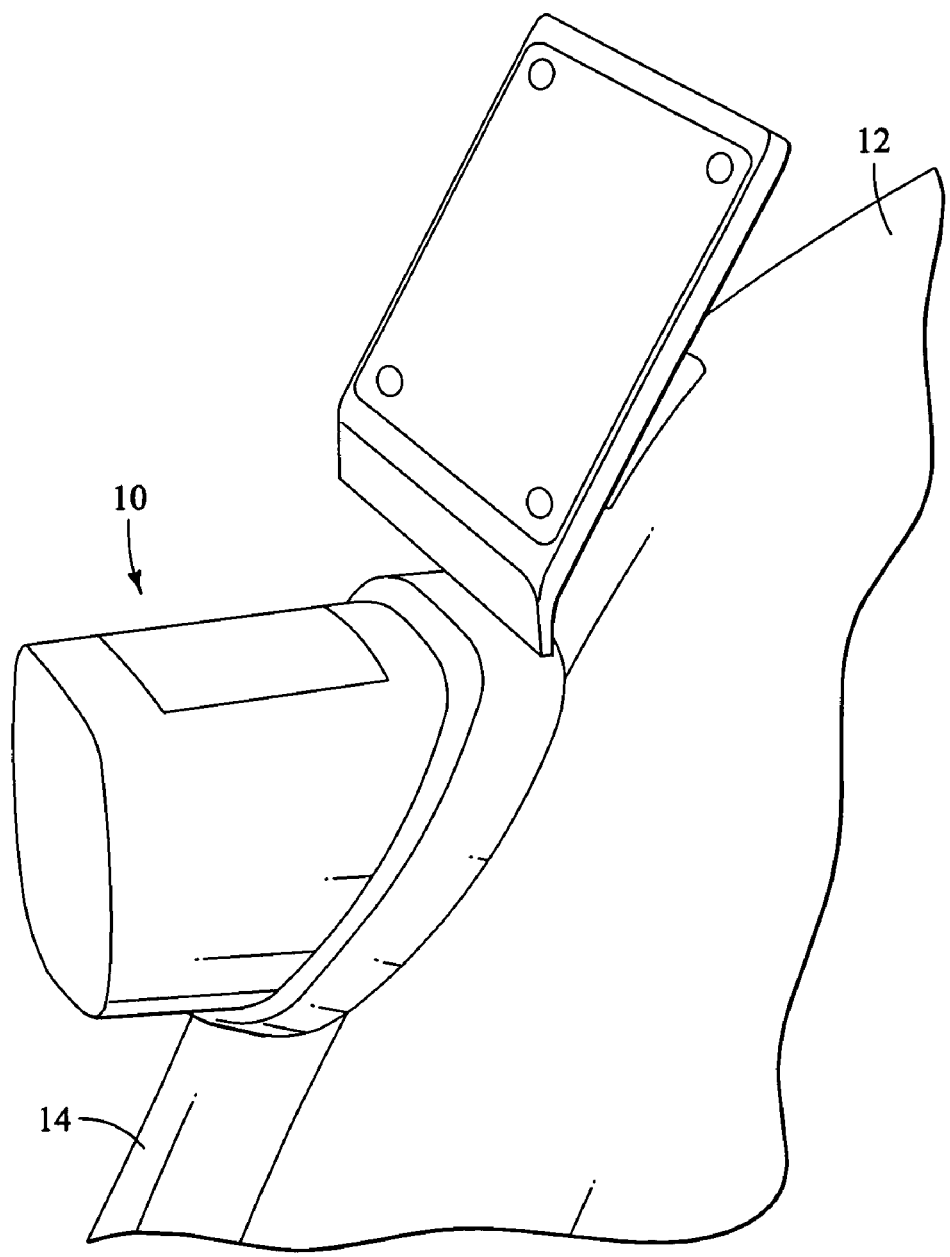
FIG. 2 is a pictorial representation of a prior art motorcycle taillight assembly.

The following detailed description is to be read with reference to the figures, in which like elements in different figures have like reference numerals. The figures, which are not necessarily to scale, depict selected embodiments and are not intended to limit the scope of the invention. Skilled artisans will recognize that the examples provided herein have many useful alternatives that fall within the scope of the invention.

Figure 3:
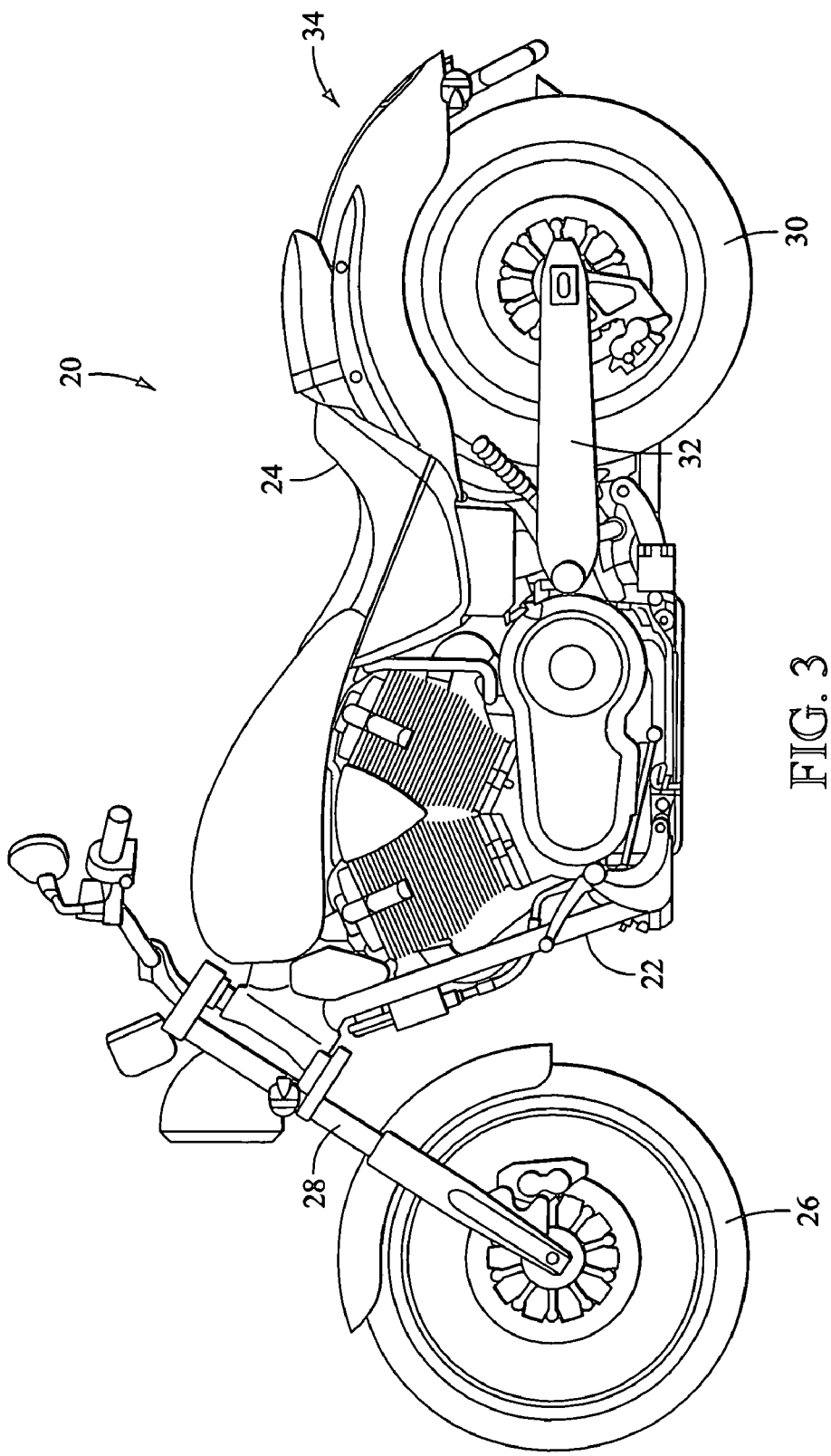
FIG. 3 is a side view of a motorcycle having a fender in accordance with an embodiment of the present invention.

The motorcycle 20 illustrated in FIG. 3 includes a frame 22, a seat 24 coupled to frame 22, a front wheel 26 coupled to frame 22 by a front fork 28, and a rear wheel 30 coupled to frame 22 by a swing arm assembly 32. A tail section 34 forms the rear portion of motorcycle 20 underneath seat 24 and above rear wheel 30.

Figure 4:
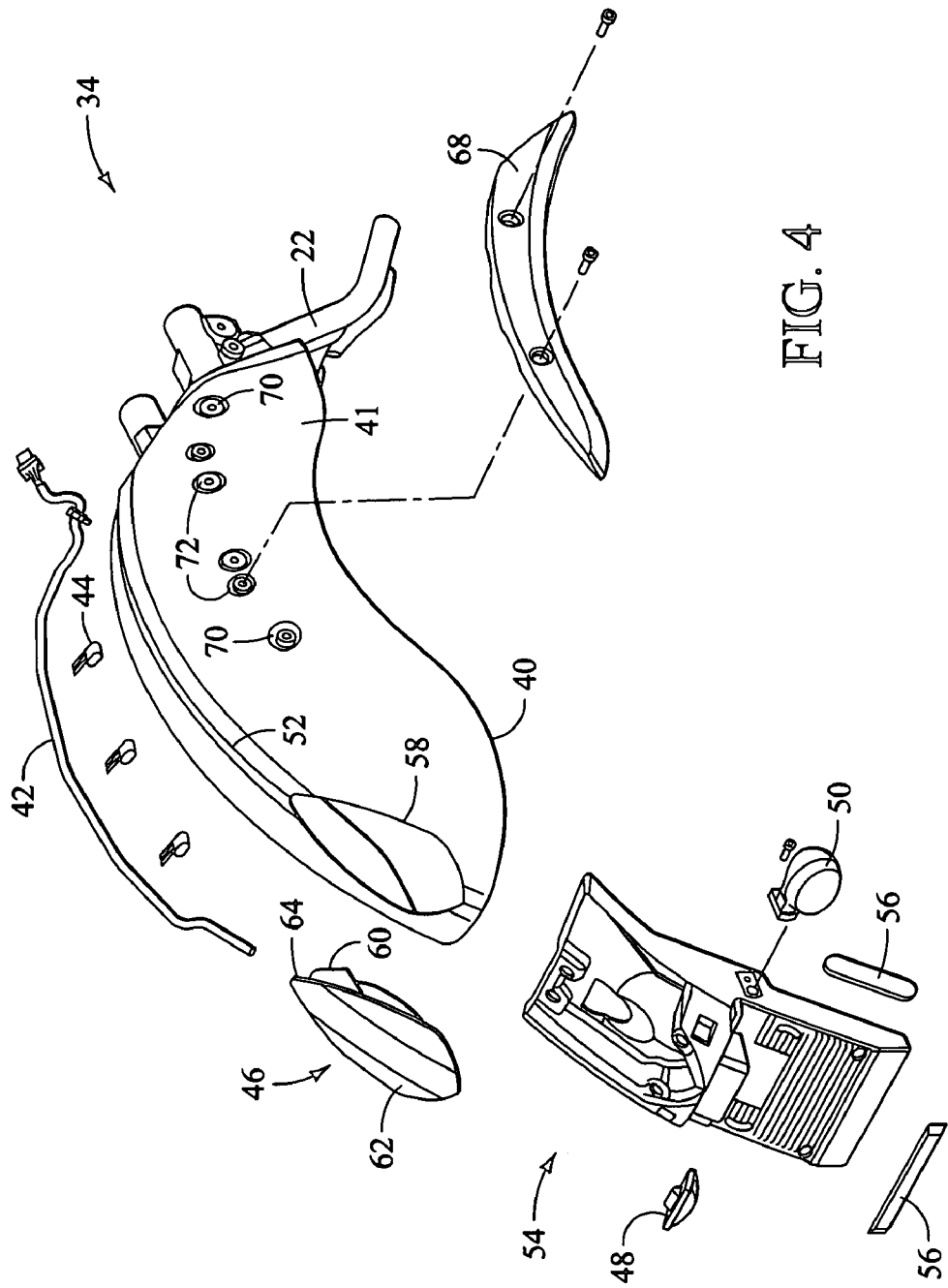
FIG. 4 is an exploded side profile view of a fender assembly in accordance with an embodiment of the present invention.

With reference to FIG. 4, an exploded side profile view of a fender assembly embodying the present invention is shown. Tail section 34 includes curvilinear fender 40 coupled to frame 22 by screws through apertures 70. In the illustrated embodiment, fender 40 is bolted to frame 22 in a conventional manner. Tail section 34 further includes harness 42, ridge 52, license plate module 54, taillight 62, and cover 68. For ease of illustration, only one side of tail section 34 is illustrated in FIG. 4.

Harness 42 is an electrical cord designed to provide power to taillight 46, license plate light 48, and turn signal light 50. Harness 42 traverses through electrical clips 44, which are attached to studs (not shown) on the underside of fender 40. Harness 42 is plugged into a main harness (not shown), which provides power to harness 42.

Taillight 46 includes a lens 62 and a reflector section 60 with reflector section 60 receding within a cavity 58 in fender 40. When taillight 46 is placed into cavity 58 on fender 40, flange 64 contacts the outside surface of fender 40 to prevent taillight 46 from traversing through cavity 58. Flange 64 is also used to fit taillight 46 to the outer surface of fender 40. Taillight 46 is then held into place by a screw to a bracket welded internally to fender 40. It is fully contemplated taillight 46 could be held in place by a bolt, glue, rivet, strap, clip, or any other fastening mechanisms known to those of ordinary skill in the art.

License plate module 54 includes license plate light 48, reflectors 56, and turn signal light 50. License plate module 54 is held to fender 40 by screws. Strut cover 68 is mounted to frame 22 through apertures 72 on outer surface 41 of fender 40 and is utilized to cover mounting apertures 70 and 72 on outer surface 41 of fender 40. Apertures 70 and 72 Ser. No. 10/612,279 (now abandoned) to Polaris Industries and is herein incorporated by reference in its entirety.

As is seen, taillight 46 has very few individual components as will be discussed in more detail below. This reduction in individual components significantly reduces the materials cost as well as the labor cost in assembling the components. In addition, cost of taillight 46 is further reduced since most components are plastic instead of chrome, however, it is fully contemplated that chrome could be used in taillight 46 depending on the desires of the consumer.

Figure 5:
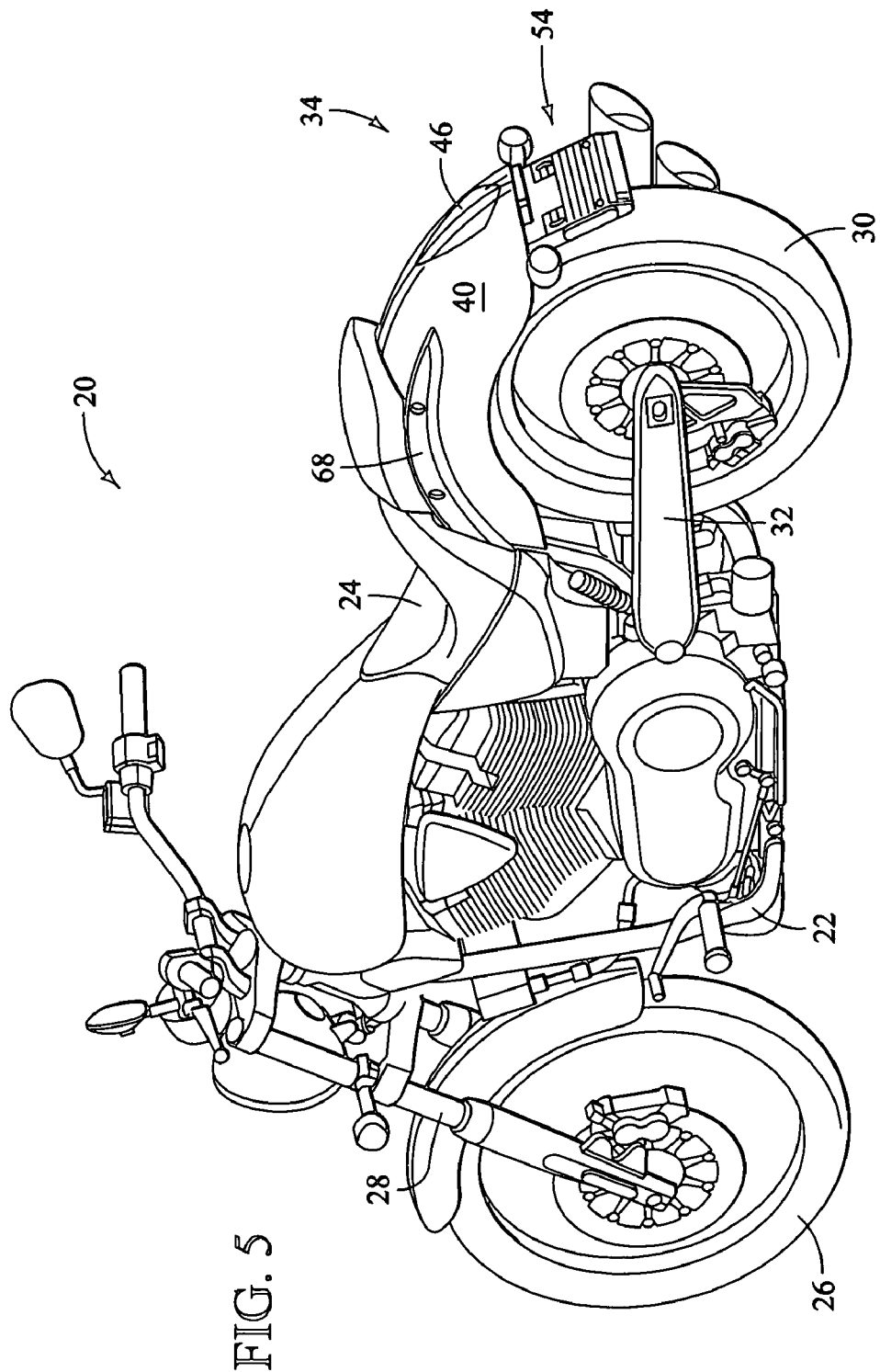
FIG. 5 is a side rear profile view of a motorcycle having a fender in accordance with an embodiment of the present invention.

With reference to FIG. 5, a side rear profile view of a motorcycle having a fender in accordance with an embodiment of the present invention is shown. The flush profile of tail section 34 on motorcycle 20 is shown in the figure. Taillight 46 fits within cavity 58 so taillight 46 fits flush on fender 40. This flush mounting not only has an aesthetic appeal, but also keeps taillight 46 from protruding out away from fender 40. Unlike traditional taillights, which are mounted on the surface of the rear fender and protrude beyond surface 12 of fender 14, taillight 46 does not protrude beyond the surface of fender 40. Therefore, the risk of damaging taillight 46 when encountering obstacles throughout use during the life of the motorcycle is significantly reduced. In contrast to prior taillight assemblies, which protrude from the fender making them susceptible to contact by obstacles, taillight 46 rests within fender 40. Therefore, if the user is inattentive or there is an unseen obstacle behind motorcycle 20, typically license plate module 54 will be the first part of motorcycle 20 to contact the obstacle. Since module 54 is more resilient than taillight 46, the rider has a better chance of not damaging motorcycle 20.

Figure 6:
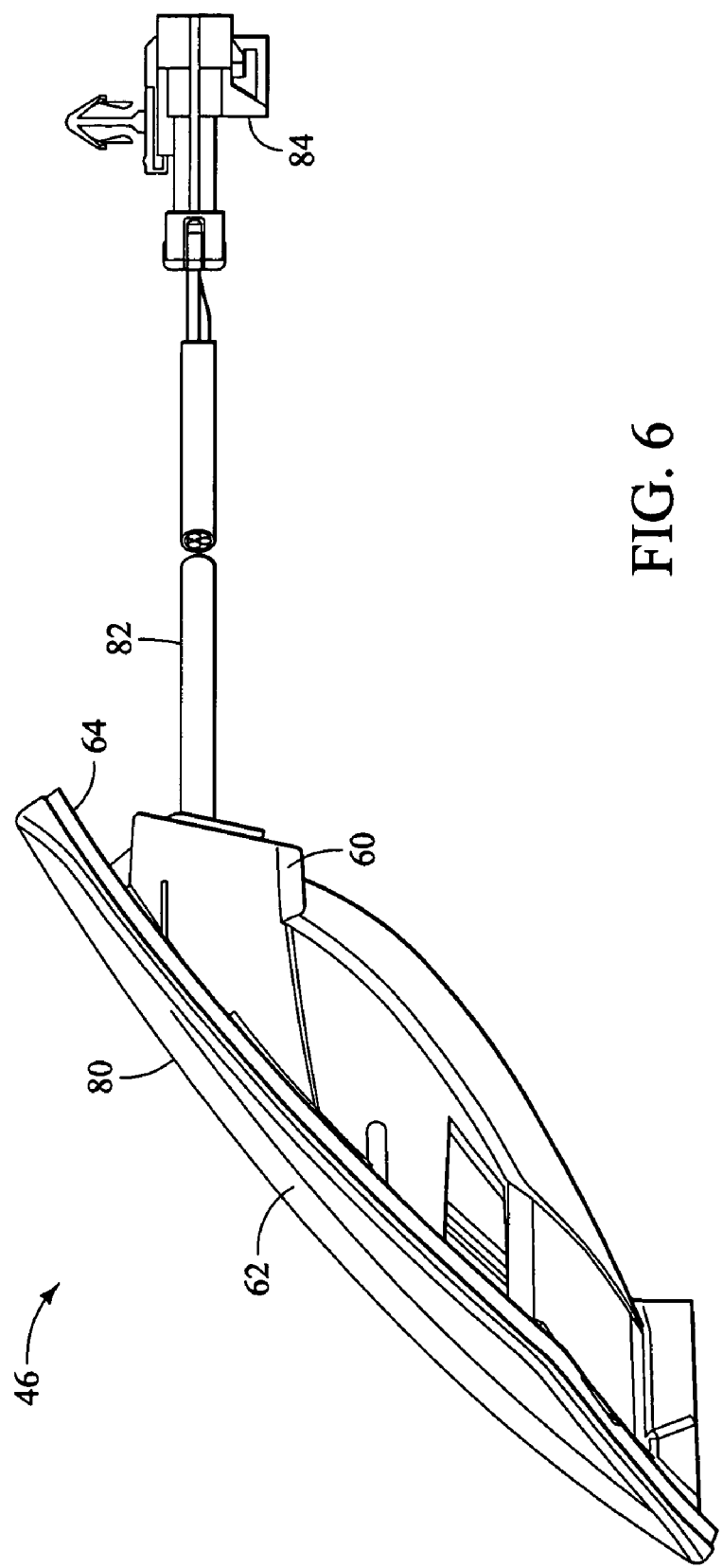
FIG. 6 is a side profile view of a taillight assembly according to an embodiment of the present invention.

With reference to FIG. 6, a side profile view of a taillight assembly according to an embodiment of the present invention is shown. Taillight 46 has a lens 62 with ridge 80, a reflector section 60, flange 64, electrical wire 82, and harness 84. Taillight 46 is unique in it houses a single LED light within reflector section 60. However, it is contemplated more than one LED could be used without departing from the spirit of the invention. Preferable the LED light is covered by a red optic free lens 62, which covers reflector optics within reflector section 60. However, it is contemplated lens 62 could be any device which capable of protectively covering the reflector optics and not be opaque (i.e., able to release light). It is also contemplated lens 62 could have optics in combination with the reflector optics. The use of optic free lens 60 and the reflector optics along with an LED makes taillight 46 substantially thin and allows taillight 46 to be flush to fender 40. Prior taillight assemblies use lens optics with a relatively large halogen bulb. This requires the taillight assembly to be placed on the outer surface of the fender due to its size. Further, the LED is not vibration sensitive unlike halogen bulbs. Therefore the LED has fewer failures then halogen bulbs. This allows taillight 46 to be designed generally for the life of motorcycle 20. When the single unseen LED has power applied, the light is directed straight down, vertically, however, the parabolic shape of the reflector optics within reflector section 60 causes the light to be directed outward horizontally from taillight 46 to satisfy FMVSS 108. FMVSS 108 stands for Federal Motor Vehicle Safety Standards section #108.

Taillight 46 is approximately 7½ inches or about 191 mm from the top tip of lens 62 to the bottom tip of lens 62 and 3.61 inches or 91.6 mm at the widest point of lens 62. The clearance between reflector section 60 and rear wheel 30 is approximately 15 mm (0.59 inches). The 15 mm clearance, measured at tire fling and full suspension compression, is primarily to accommodate manufacturing tolerances, assembly tolerances and vibration-induced motion. Further, it assists in preventing the fling of rear tire 30 from contacting taillight 46. The faster rear tire 30 rotates it grows in diameter and becomes narrower. This is called the fling surface of the tire. Therefore a spacing of 15 mm (0.59 inches) from the rear of reflector section 60 to the outer diameter of rear wheel 40 allows taillight 46 to avoid the fling diameter at full suspension compression. Therefore, the present invention allows for taillight 46 to be placed within and flush with fender 40 without moving fender 40 further away from rear tire 30, which can cause increased vibration. It is this increased vibration that prompted prior motorcycle manufactures to keep the fender close to the tire and put the taillight on the outside of the fender.

Preferably lens 62 is red, however, it is contemplated lens 62 can be any color. FMVSS section 108 does require all taillight lighting must be red in color. No white light from any source may project rearward of motorcycle 20. Therefore, lens 62 could be any color provided the light emitted from the LED is red. In a preferred embodiment lens 62 is red, as is the LED. Lens 62 is further free of optics as discussed above. That is, lens 62 does not assist in focusing the LED light. Instead, reflector section 60 is wholly responsible for focusing the LED light. However, it is contemplated there could be a combination of lens and reflector optics. Prior motorcycle taillights have optics in the lens itself to aim the light. Lens 62 further provides protection to the LED and the optics within reflector section 60.

With further reference to FIG. 6, taillight 46 has what is often referred to as a "pig tail". The "pig tail" has approximately 7.7 inches of electrical wire 82 and a plug 84 extending out of the back of reflector section 60. The "pig tail" is part of taillight 46 and plug 84 plugs right into a connector on harness 42. Electrical wire 82 is a multiple stipple conductor or a stranded copper 18-gauge wire. Plug 84 is a Packard connector comprising a sealed three-cavity connector. Constant power is fed to taillight 46 which powers up an LED circuit. The LED comes on at a lower light output level than when the brakes are applied. When the brakes are applied an input is sent from one of two brake switches on motorcycle 20, and when that input is applied to taillight 46 then the LED has a higher light output to notify persons behind motorcycle 20 the motorcycle is going to slow or stop.

One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A motorcycle light assembly apparatus, comprising:
   a light source;
   a lens having a shape conforming to an outer surface of a rear fender and covering said light source, said lens being generally flush with the outer surface and;
   a reflector section housing said light source and secured to said lens; and
   a fastener to attach said reflector section within a cavity in said fender.

2. The apparatus of claim 1 wherein said light source has a shallow profile to prevent contact with a tire.

3. The apparatus of claim 2 wherein said reflector section directs light in a wide distribution path.

4. The apparatus of claim 3 wherein said light source has a high intensity LED to provide illumination.

5. The apparatus of claim 4 wherein said high intensity LED is small to fit within the shallow profile of the light source.

6. A motorcycle comprising:
   a frame;
   a front wheel coupled to said frame;
   a rear wheel coupled to said frame;
   a rear fender having aperture extending inwardly from an outer surface of said fender;
   a light source mount disposed in said aperture; and
   a lens having a shape conforming to said outer surface of said fender and covering said mount, said lens being generally flush with said outer surface of said fender.

7. A motorcycle as claimed in claim 6, further comprising a ridge on the outer surface of said lens.

8. A motorcycle as claimed in claim 7, wherein said ridge is generally as long as the fender.

9. A motorcycle as claimed in claim 6, wherein said light source mount has a shallow profile to prevent contact with the rear wheel.

10. A motorcycle as claimed in claim 9, wherein said light source mount directs light in a wide distribution path.

11. A motorcycle as claimed in claim 10, wherein said light source mount further comprises a high intensity LED to provide illumination.

12. A motorcycle as claimed in claim 11, wherein said high intensity LED is small enough to fit within the shallow profile of the light source.

13. In a motorcycle having a rear wheel secured by axle nuts, an integrated motorcycle fender and light assembly comprising:
    a cavity in said fender;
    a light emitter located within the cavity; and
    a lens, shaped in a generally continuation of existing curvilinear contours of the fender, covering the cavity, the lens when mounted covers the light emitter;
    wherein the lens covering the cavity is integral and continuous with the curvilinear external contour of the fender, making the fender and a light assembly consisting of the light emitter and lens integrated.

14. The motorcycle of claim 13 wherein the lens permits emission of light radiation from the light emitter from the rear of the motorcycle.

15. The motorcycle of claim 13 further comprising electrical wiring for the light emitter routed on a surface of the fender.

16. In a motorcycle having a rear wheel, an integrated fender and light assembly comprising:
    a fender having a curvilinear external contour and a cavity disruptive of the curvilinear external contour;
    a light emitter located within the cavity; and
    a lens shaped generally in continuation of existing curvilinear contours of the fender, covering the cavity, the lens when mounted covers the light emitter;
    wherein the lens covering the cavity is integral and continuous with the curvilinear external contour of the fender.

17. The motorcycle of claim 16 wherein the lens permits emission of light radiation from the light emitter from the rear of the motorcycle.

18. The motorcycle of claim 16 further comprising electrical wiring for the light emitter routed on a surface of the fender.

19. A motorcycle of claim 16, wherein said light emitter has a shallow profile to prevent contact with the rear wheel.

20. A motorcycle of claim 19, wherein said light emitter directs light in a wide distribution path.

21. A motorcycle of claim 20, wherein said light emitter further comprises a high intensity LED to provide illumination.

22. A motorcycle of claim 21, wherein said high intensity LED is small enough to fit within the shallow profile of the light emitter.

23. A light assembly for mounting to a motorcycle rear fender that has an aperture sized to receive the light assembly, the light assembly comprising:
  a reflector;
  a source of light, and;
  a lens having a shape conforming to an outer surface of the fender wherein the lens is flush with the outer surface of the fender.

24. The light assembly of claim 23 wherein said source of light has a shallow profile to prevent contact with a tire.

25. The apparatus of claim 24 wherein said source of light directs light in a wide distribution path.

26. The apparatus of claim 25 wherein said source of light has a high intensity LED to provide illumination.

27. The apparatus of claim 26 wherein said high intensity LED is small to fit within the shallow profile of the light source.

28. A motorcycle light assembly apparatus, comprising:
  a light source;
  means for covering said light source having a shape conforming to an outer surface of a rear fender and being generally flush with the outer surface;
  a reflector section housing said light source and secured to said means for covering said light source; and
  a fastener to attach said reflector section within a cavity in said fender.

29. A motorcycle light assembly as claimed in claim 28, further comprising a ridge on the outer surface of said fender.

30. A motorcycle light assembly as claimed in claim 29, wherein said ridge is generally as long as the fender.

31. A motorcycle light assembly as claimed in claim 28, wherein said reflector section has a shallow profile to prevent contact with the rear wheel.

32. A motorcycle light assembly as claimed in claim 31, wherein said reflector section directs light in a wide distribution path.

33. A motorcycle light assembly as claimed in claim 32, wherein said reflector section further comprises a high intensity LED to provide illumination.

34. A motorcycle light assembly as claimed in claim 33, wherein said high intensity LED is small enough to fit within the shallow profile of the light source.

* * * * *